(12) United States Patent
Johnson et al.

(10) Patent No.: US 12,109,763 B2
(45) Date of Patent: Oct. 8, 2024

(54) LASER WELDING PLASTIC SEGMENTS

(71) Applicant: CANON VIRGINIA, INC., Newport News, VA (US)

(72) Inventors: Joel C. Johnson, Franklin, VA (US); Takeshi Mochida, Newport News, VA (US); Terry Speed, Toano, VA (US)

(73) Assignee: Canon Virginia, Inc., Newport News, VA (US)

( * ) Notice: Subject to any disclaimer, the term of this patent is extended or adjusted under 35 U.S.C. 154(b) by 253 days.

(21) Appl. No.: 17/632,041

(22) PCT Filed: Jul. 27, 2020

(86) PCT No.: PCT/US2020/043757
§ 371 (c)(1),
(2) Date: Feb. 1, 2022

(87) PCT Pub. No.: WO2021/025889
PCT Pub. Date: Feb. 11, 2021

(65) Prior Publication Data
US 2022/0274344 A1   Sep. 1, 2022

Related U.S. Application Data

(60) Provisional application No. 62/882,264, filed on Aug. 2, 2019.

(51) Int. Cl.
B29C 65/16    (2006.01)
B29C 33/00    (2006.01)
(Continued)

(52) U.S. Cl.
CPC ...... *B29C 65/1632* (2013.01); *B29C 33/0016* (2013.01); *B29C 33/3807* (2013.01); *B29C 33/3842* (2013.01); *B29C 65/1603* (2013.01); *B29C 65/1612* (2013.01); *B29C 65/1616* (2013.01); *B29C 65/1648* (2013.01); *B29C 65/1661* (2013.01); *B29C 66/1142* (2013.01);
(Continued)

(58) Field of Classification Search
CPC . B29C 33/3842; B29C 65/16; B29C 65/1603; B29C 65/1612; B29C 65/1648; B29C 65/1661; B29C 66/1142; B29C 66/32; B29C 66/326; B29C 66/328; B29C 66/739; B29C 66/7392; B29C 66/73921; B29K 2025/06; B29K 2825/06; B29L 2031/757
USPC .............. 264/219, 337, 482, 492; 156/272.8, 156/304.1; 249/134
See application file for complete search history.

(56) References Cited

U.S. PATENT DOCUMENTS

2005/0077656 A1   4/2005   Watanabe et al.
2006/0144555 A1   7/2006   Susuki et al.
(Continued)

FOREIGN PATENT DOCUMENTS

DE   195 10 493 A1   10/1995
JP   2004058581 A    2/2004
(Continued)

*Primary Examiner* — Leo B Tentoni
(74) *Attorney, Agent, or Firm* — Canon U.S.A., Inc., IP Division

(57) ABSTRACT

The present disclosure relates to methods and components for the bonding together of plastic components during a manufacturing and/or assembly process to create molds for lost-wax casting.

13 Claims, 5 Drawing Sheets

(51) Int. Cl.
  *B29C 33/38*  (2006.01)
  *B29C 65/00*  (2006.01)
  *B29K 25/00*  (2006.01)
  *B29L 31/00*  (2006.01)

(52) U.S. Cl.
  CPC ............ *B29C 66/32* (2013.01); *B29C 66/326* (2013.01); *B29C 66/328* (2013.01); *B29C 66/739* (2013.01); *B29C 66/7392* (2013.01); *B29C 66/73921* (2013.01); *B29K 2025/06* (2013.01); *B29K 2825/06* (2013.01); *B29K 2995/0094* (2013.01); *B29L 2031/757* (2013.01)

(56) References Cited

U.S. PATENT DOCUMENTS

| | | | |
|---|---|---|---|
| 2008/0261065 A1* | 10/2008 | Fujimoto | B29C 65/7829 |
| | | | 156/272.8 |
| 2010/0301522 A1 | 12/2010 | Hokoda et al. | |
| 2011/0139753 A1* | 6/2011 | Lee | B23K 26/244 |
| | | | 219/121.64 |
| 2011/0203726 A1 | 8/2011 | Zaitsu et al. | |
| 2011/0270356 A1* | 11/2011 | McKenzie | B32B 27/28 |
| | | | 156/272.6 X |
| 2013/0022766 A1* | 1/2013 | Butzke | B29C 66/9161 |
| | | | 156/272.8 |
| 2017/0239858 A1 | 8/2017 | Won | |

FOREIGN PATENT DOCUMENTS

| | | | |
|---|---|---|---|
| JP | 2007-523763 A | 8/2007 | |
| JP | 2010-149390 A | 7/2010 | |
| JP | 2011-161633 A | 8/2011 | |
| JP | 2011-255683 A | 12/2011 | |
| JP | 2013-176975 A | 9/2013 | |
| JP | 2014-529522 A | 11/2014 | |
| JP | 2017-029988 A | 2/2017 | |
| WO | 03/011574 A1 | 2/2003 | |

* cited by examiner

Prior Art

LASER WELDING PLASTIC SEGMENTS

CROSS REFERENCE TO RELATED APPLICATIONS

This application is a national stage of International Patent Application PCT/US20/43757 filed Jul. 27, 2020, which claims the benefit of U.S. Provisional Application 62/882,264, which was filed on Aug. 2, 2019.

BACKGROUND

Field of the Disclosure

The present disclosure relates to methods and components for the bonding together of plastic components during a manufacturing and/or assembly process to create molds for lost-wax casting.

Description of the Related Art

Stator and Wheel Type Products that use plastic segments currently require that each segment be made using injection molding or other similar methods. The plastic segments are bonded together into a ring using a bonding agent and assembly fixture. After the segments are assembled into a ring, a seam between the segments is created that must be filled to eliminate a concave area that remains between the segments. The area needs to be sealed to prevent post processing liquids from penetrating a mold.

FIGS. 1A-1C illustrates a currently known process. FIG. 1A illustrates a first segment 1 and a second segment 2, where a laser is used to form a weld seam that designed with a groove to aid adhesive application after bonding of the first segment 1 and the second segment 2. FIG. 1B illustrates material being pushed up to one side as the first segment 1 and second segment 2 are joined. FIG. 1C illustrates a reduction in the width of the first segment 1 and second segment 2 as the material is squeezed due to the first segment 1 and second segment 2 being joined.

The current process used to eliminate the concave area between the first segment and the second segment is labor intensive and in some instances it becomes difficult to achieve specific customer requirements via a manual process. There is typically a dimensional requirement for a part profiles as well as a seal requirement. If it becomes necessary to repair the dimensional profile as well to fix portions of the sealed joint that cause molds to leak, parts need to be reworked.

SUMMARY OF THE DISCLOSURE

Aspects of the present disclosure provide methods and components to provide a more effective joining of a plurality of segments and to eliminate the need for any additional processing.

Aspects of the present disclosure relates to methods and components for bonding together of plastic components during a manufacturing and/or assembly process.

At least two resin parts to be assembled by a laser welding process for creating a resin mold for a lost-wax casting process, the at least two resin parts comprising a first resin part including a top surface, a side surface, and an edge portion between the top surface and the side surface, wherein the edge portion includes a protruding portion protruding outwardly from the top surface, and a second resin part including, a top surface, a side surface to be mated with the side surface of the first resin part, and an edge portion, between the top surface of the second resin part and the side surface of the second resin part, wherein the edge portion of the second resin part includes a protruding portion protruding outwardly from the top surface of the second resin part, wherein the protruding portion of the second resin part is mated with the protruding portion of the first resin part to form a single bump with a seam line on a continuous surface of the single bump, and wherein the single bump protrudes outwardly from the top surface of the first resin part and the top surface of the second resin part.

Additional embodiments, features, and advantages will become apparent based on the following detailed description of exemplary embodiments when taken in conjunction with the appended drawings and provided claims.

BRIEF DESCRIPTION OF THE DRAWINGS

The accompanying drawings, which are incorporated herein and form part of the specification, illustrate various embodiments features, and advantages of the present disclosure.

Figure 1A:
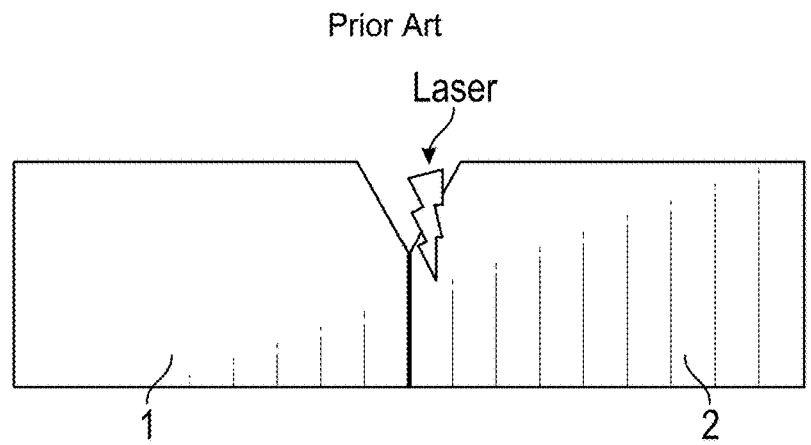
FIGS. 1A-C illustrate a conventional method for bonding two segments.
Figure 1B:
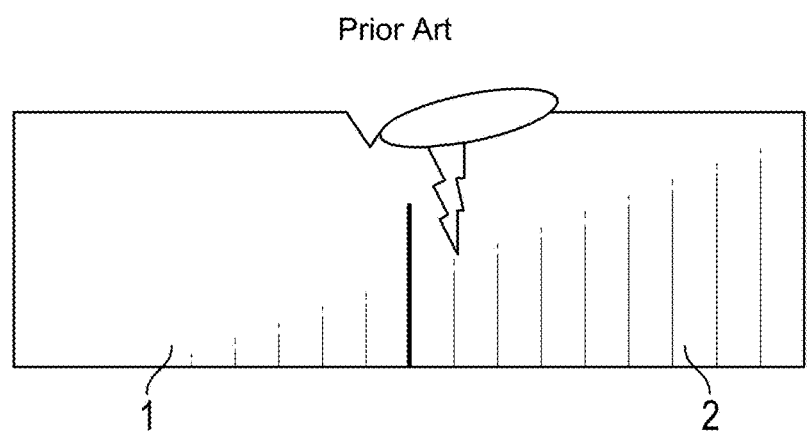
Figure 1C:
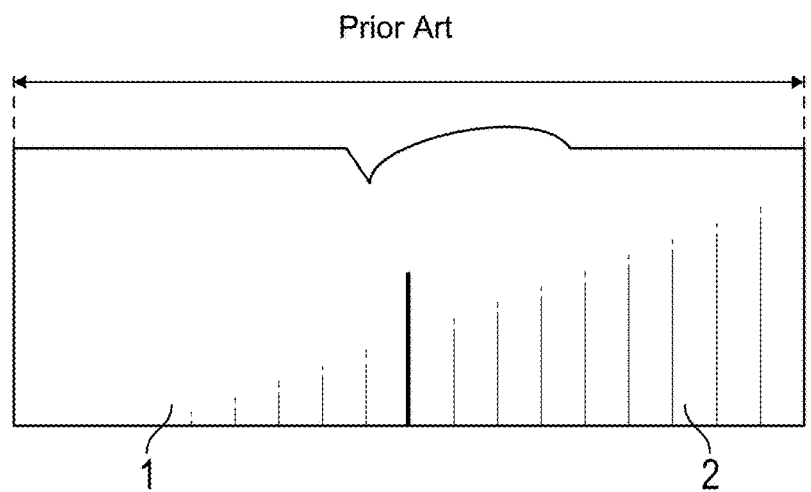

Throughout the figures, the same reference numerals and characters, unless otherwise stated, are used to denote like features, elements, components or portions of the illustrated embodiments. While the subject disclosure will now be described in detail with reference to the Figures, it is done so in connection with the illustrative exemplary embodiments. Changes and modifications can be made to the described exemplary embodiments without departing from the true scope and spirit of the subject disclosure as defined by the appended claims.

DETAILED DESCRIPTION OF EXEMPLARY EMBODIMENT

The present disclosure includes several embodiments and relies on patents, patent applications and other references for details known to those of the art. Therefore, when a patent, patent application, or other reference is cited or repeated herein, it should be understood that it is incorporated by reference in its entirety for all purposes as well as for the proposition that is recited.

Figure 7:
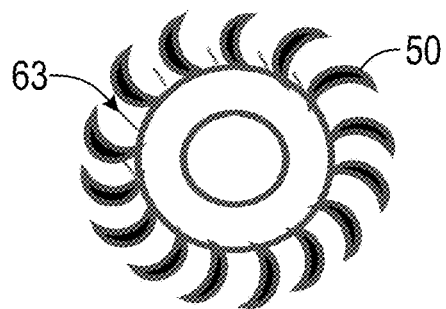
FIG. 7 illustrates individual segments of material welded into a ring structure according to the present disclosure

The present disclosure relates to filling a concave area between plastic segments to modify part geometry and then laser welding the plastic segments together to enable joining the plastic segments to maintain their original dimensions while preventing molding material from leaking at the seam created by joining the plastic segments. Laser welding effectively bonds and seals the plastic segments together without requiring a secondary process to fill the void between the plastic segments. The plastic segments are assembled as illustrated in the provided figures. In one exemplary embodiment the plastic segments can be welded into a ring as illustrated in FIG. 7.

Figure 2:
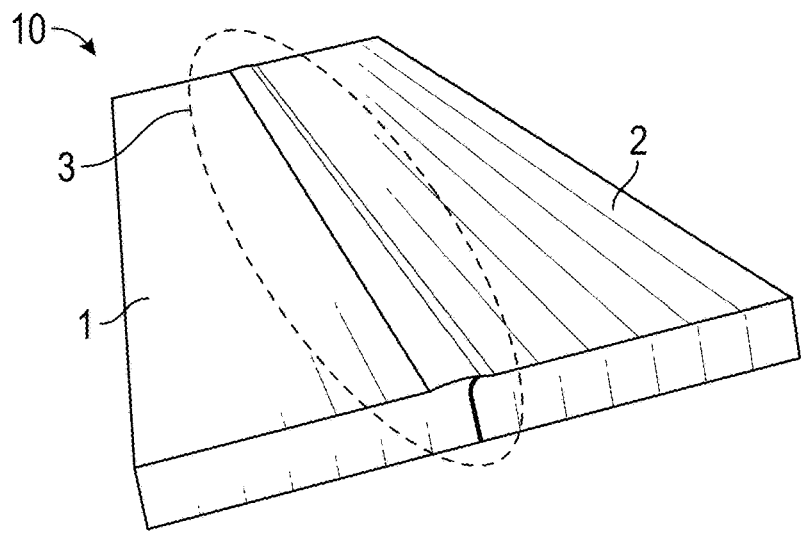
FIG. 2 illustrates a part of a welded product according to the present disclosure.
Figure 3:
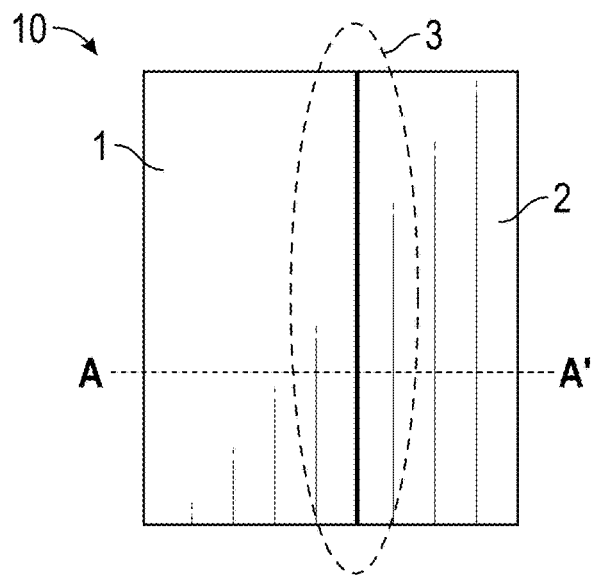
FIG. 3 illustrates a top view of a welded product according to the present disclosure.
Figure 4:
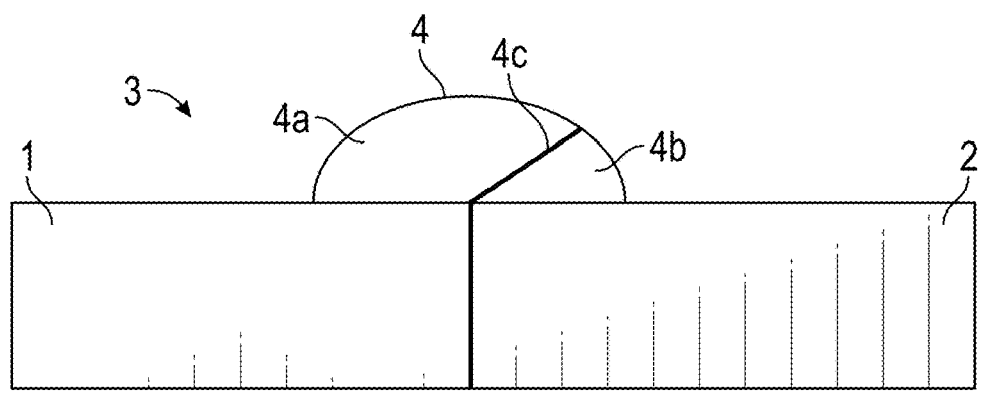
FIG. 4 illustrates an enlarged sectional view of a boundary area along line A-A' in FIG. 3.

FIG. 2 illustrates a part of a welded product 10. The welded product 10 includes a first segment 1 and a second segment 2. There is a boundary area 3 between the first segment 1 and the second segment 3. FIG. 3 illustrates a top view of part of the welded product 10. FIG. 4 illustrates an enlarged sectional view of the boundary area 3 along line A-A' in FIG. 3. Bump 4 includes bump 4a, which is part of the first segment 1 and bump 4b, which is part of the second segment 2. Bump 4a and bump 4b are welded together at boundary 4c using, for example, a laser.

As illustrated in FIG. 2 and FIG. 4, a weld angle can be used that is angle other than 90 degrees. A weld seam, which is a seam face between the first segment 1 and the second segment 2 at the bump 4 does not need to be angled i.e., the Weld Angle can be 90 degrees.

In a known approach, segments are designed with a concave step and or chamber to enable a secondary process of filling the concave area between the segments. This known design is not ideal for producing a profile that meets product specification requirements using a laser. Preliminary laser welding tests resulted in good welds using the current design between the segments. While the results meet the profile requirements, because of the original segment design, laser welding caused the diameter of a welded ring to shrink. Each welded seam of the final product required clamp pressure and a little material pushed up at each weld seam. This caused a reduction in the size of each segment, which resulted in the overall diameter of the ring shrinking below the dimensional requirements of the product.

An alternative segment design is provided that will facilitate producing the required product profile and hermetic seal when used with laser welding. The design is unique and a key component of the process required to laser weld plastic segments. At least one advantage of this design is that the dimensions of the parts are maintained during a laser operation.

Redesigning the plastic segments at the weld seam and ideal laser welding techniques and settings enable an effective replacement of bonding and sealing plastic segments together. Thus, in an exemplary embodiment, the bonding and sealing of the plastic segments together is replaced with bonding and laser welding plastic segments together.

According to an exemplary embodiment of the present disclosure, redesigned plastic segments enable meeting the dimensional profile and sealing requirements of finished products. This is accomplished by utilizing laser welding in place of chemical bonding and adhesive sealing as performed in known approaches. Redesign of the plastic segments eliminates the concave gap between the plastic segments, which consequently eliminates the need for a post process to fill the concave gap.

The laser settings used enable effectively bonding and sealing the weld joint. The approach and number of passes used by the laser are essential to seal and bond the weld joint. Exemplary laser settings may include:

Laser Welding Parameters

TABLE 1

Figure 11:
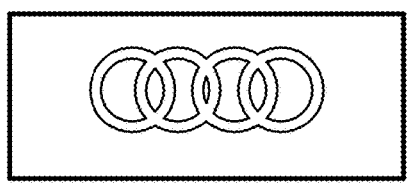
FIG. 11 illustrates the pattern repeated by the laser during an operation of the laser.

| | |
|---|---|
| #1. Laser Power (Laser Power is set by Controller 27 and Generator 26; the Laser Power total range is 120 Watts) | range equals 10 to 30%; |
| #2. Focal Length (focal length is from face of galvanometer to work piece) | range equals 170 to 200 mm; see FIG. 9 |
| #3. Clock Speed (the speed the laser 24 moves across the work piece) | range equals 25000 to 35000 galvanometer steps/sec.; |
| #4. Laser Passes (the number of times the laser passes over the work piece) | range equals 2 to 10 laser passes; |
| #5. Clamp Pressure (the amount of force applied to the mating work pieces during lasing see FIG. 4 above) | range equals 0 to 10 pounds; see FIG. 5 |
| #6. Welding Pattern (the pattern repeated by the laser during lasing) | Overlapping patterns, as illustrated in FIG. 11 |
| #7. Weld Time (the time from weld start to stop, not including work piece loading) | range is dependent on Clock Speed and Laser Passes |
| #8. Laser Wave Length | 1900 nanometers to 2100 nanometers |

Laser welding hermetically seals the joint to prevent liquid penetration in post mold processing. Consequently seal repair rework is eliminated. This was previously achieved with adhesive sealing and chemical bonding followed by significant rework.

The present embodiment enables automating the process by using a laser in lieu of an operator manually applying an adhesive seal material and rework process.

Overall the present disclosure enhances the repeatability of uniformly and stably attaching the plastic segments together by eliminating opportunities for human error.

The present disclosure enables cost reduction in processing by improving first pass yield and eliminating a process step and rework.

By providing pairs of parts, i.e. the first segment 1 and the second segment 2, which forms the bump, i.e., bump 4, protruding outwardly from the top surfaces of the parts when welded together, the seam between the parts does not include a recess from the top surface. This can reduce or completely eliminate the post-processing after the laser welding to fill the recess with a resin.

By providing the pairs of parts, i.e., the first segment 1 and the second segment 2, which forms the bump, i.e., bump 4, with a seam face (Weld Seam 63) angled (to the second segment 2) with respect to the seam of the bonding agent area, and irradiating the laser directed towards the second segment 2, the resin on the second segment 2 pushes up from the laser penetration and heating, causing expansion and sealing the seam where the material overlaps. This process does not need a high clamp pressure applied to the two parts during the laser welding process, and therefore avoids shrinkage of the welded parts.

Figure 5A:
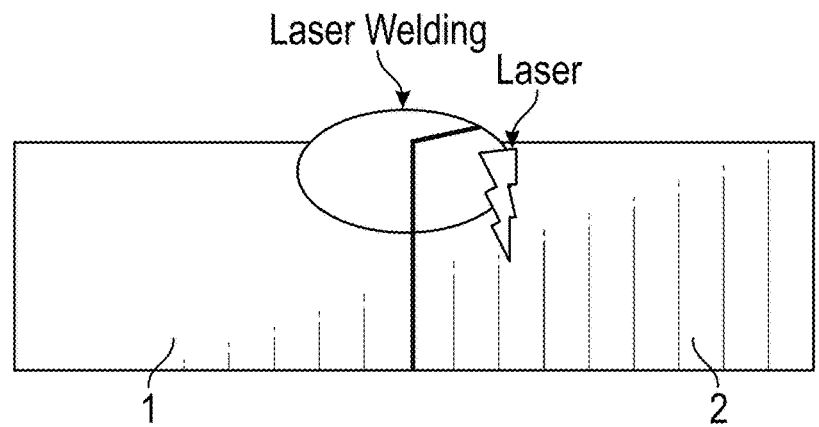
FIGS. 5A-C illustrate a welding process according to the present disclosure.
Figure 5B:
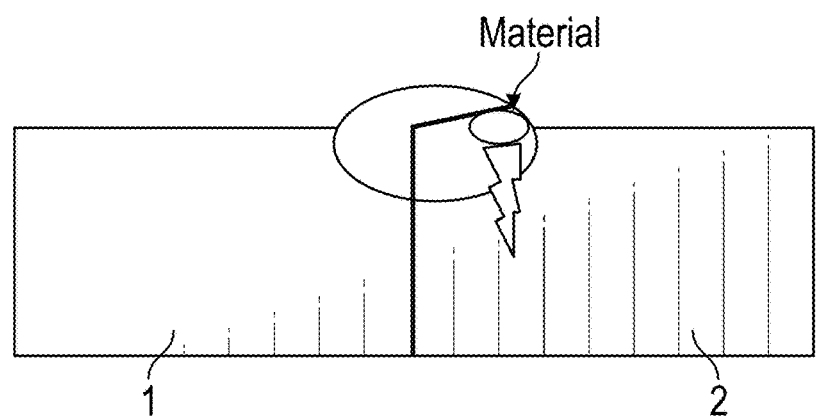
Figure 5C:
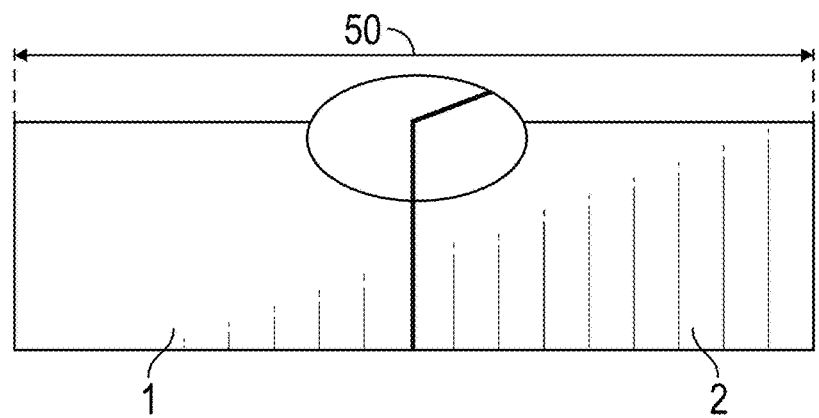

FIGS. 5A-5C illustrate an example of the above-described welding process for welding the first segment 1 and the second segment 2. FIG. 5A illustrates the first segment 1 and the second segment 2 where the conventional art's bonding agent groove is removed and laser welding results in a material overlap at the weld seam. The initial dimensions of resulting bump are set to meet initial requirements after performance of the laser welding operation. FIG. 5B illustrates the first segment 1 and the second segment 1 where material pushes up as a result of the laser welding operations. The heating associated with the laser welding operation causes expansion of the material. The seam where the material overlaps with the first segment 2 and the second segment 2 is sealed. FIG. 5C illustrates that, according to the exemplary embodiment, in addition to the resulting bump and weld seam meeting customer/product requirements, the overall dimension 50 of the combined first segment 1 and second segment 2 is maintained during the laser welding operation.

Figure 6:
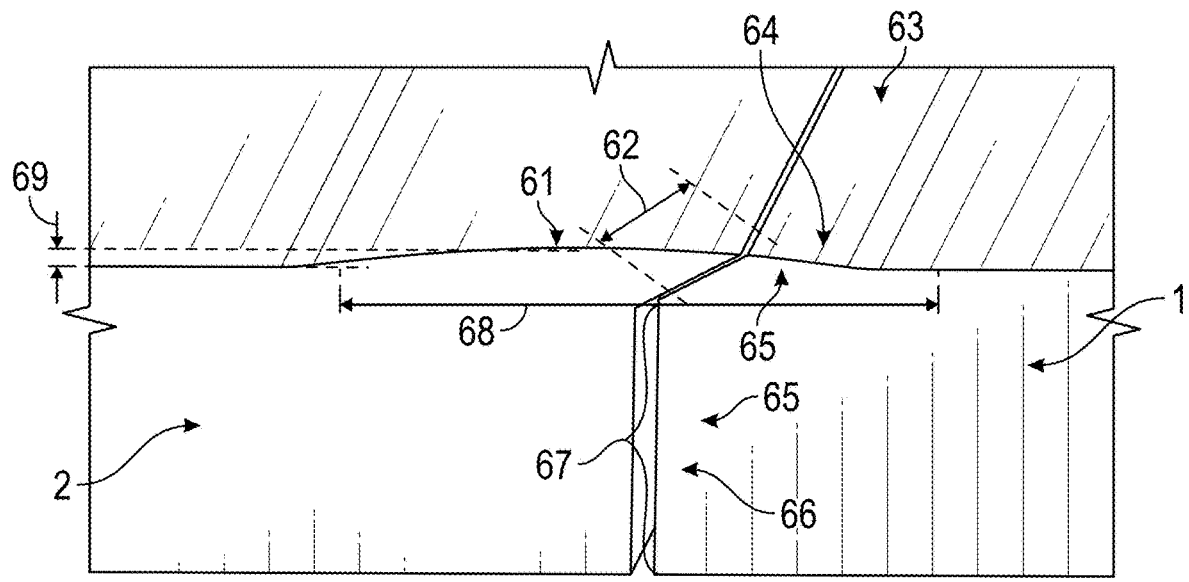
FIG. 6 illustrates a cross-sectional depiction of a weld joint according to the present disclosure.

FIG. 6 illustrates a cross-sectional depiction of a weld joint resulting from the welding process of FIGS. 5A-5C. As described above, Weld Seam Bump 61 is a bump generated by material being pushed up during the laser welding operation. Weld Seam Overlap Thickness 62 is a thickness amount associated with the material that overlaps the first segment 1 and the second segment 2 as described with respect to FIG. 5B.

Figure 8:
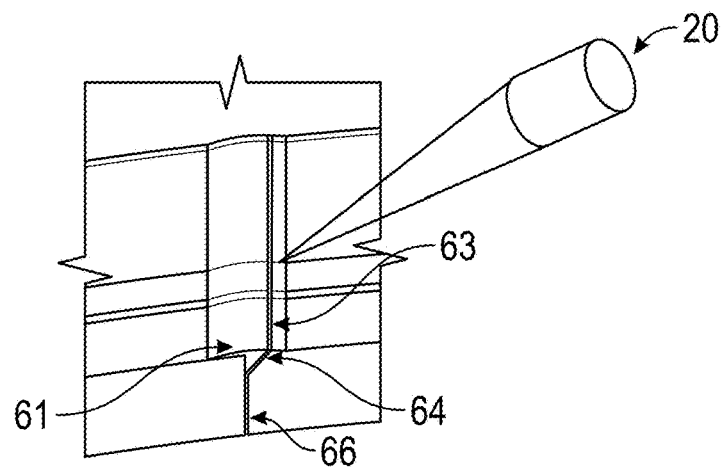
FIG. 8 illustrates a weld joint in relation to a laser welding system according the present disclosure.

Weld Seam 63 is the seam generated by the laser welding operation where the first segment 1 and the second segment 2 are connected. Weld Angle 65 is the angle of the weld. Part to Part Clearance 66 is the amount of clearance between the first segment 1 and the second segment 2. Bonding Agent Area 67 is the area where the bonding agent is placed. Seam Bump Width 68 represents the width of the bump 4. Seam Bump Height 69 represents the height of the bump 4. FIG. 8 illustrates the weld joint of FIG. 6 in relation to a laser welding system 20 (described below).

Exemplary parameters for weld seam design can include the following (with reference to FIGS. 6 and 8):
1. Weld Seam 63 as illustrated in FIG. 6 and FIG. 8
   A. Weld Seam Clearance 64 has a range of −0.001" to 0.004"
   B. Weld Seam Overlap Thickness 62 has a range of 0.015" to 0.100"
   C. Weld Seam 63, Weld Angle 65 has a range of 15 to 75 degrees (see FIG. 6)
2. Part Clearance as illustrated in FIG. 6 and FIG. 8
   A. Part to Part Clearance 66 has a range of 0.001" to 0.010"
   B. Part clearance Bonding Agent Area 67 has a range of 0% to 100% (see FIG. 6)
3. Weld Seam Bump 61 as illustrated in FIG. 6 and FIG. 8
   A. Seam Bump Height 69 has a range of 0.002" to 0.010"
   B. Seam Bump Width 68 has a range is 0.030" to 0.100"
4. Material Type is Polystyrene Plastic Test results used to determine the exemplary parameters for laser settings and weld seam design are illustrated in Table 2.

Figure 9:
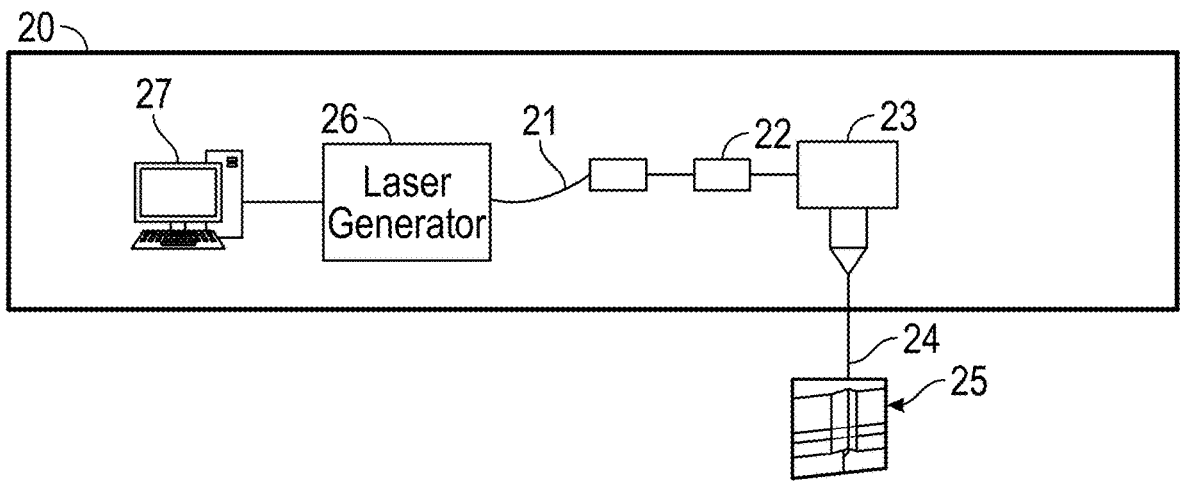
FIG. 9 illustrates a laser welding system according to the present disclosure.

FIG. 9 illustrates a laser welding system 20 according to an exemplary embodiment. The laser welding system 20 includes a controller 27, a laser generator 26 (oscillator), a transfer fiber 21, a beam shaper 22, and a laser galvanometer 23. The laser generator 26 generates a laser beam via, for example, a diode laser pump (not illustrated). The transfer fiber 21 transfers the laser beam generated by the laser generator 26 to the beam shaper 22. The beam shaper 22 re-shapes the laser beam and transmits it to the galvanometer head 23. The galvanometer head 23 moves the laser beam along the weld path. The galvanometer head 23 outputs a laser beam 24 to a welding target 25. The controller 27 controls the galvanometer head 23 to change the direction of the laser beam 24 across the welding target 25 with the laser beam 24.

Figure 10:
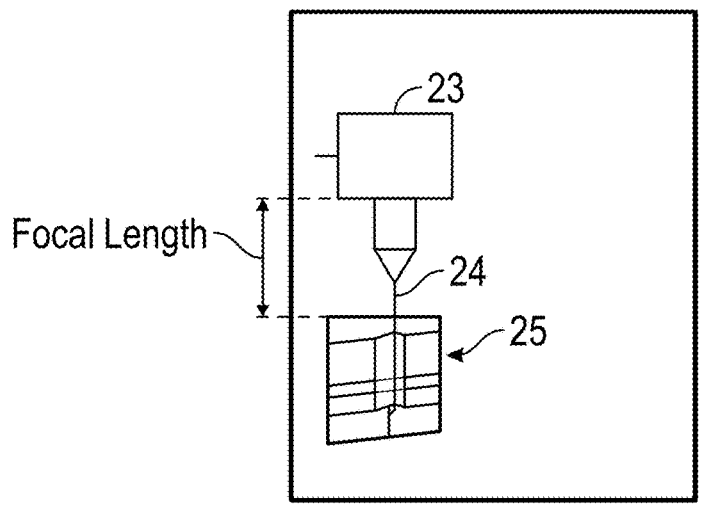
FIG. 10 illustrates a portion of a laser welding system according to the present disclosure.

FIG. 10 illustrates that a focal length used in the laser welding operation is measured from a side of the galvanometer head 23 facing the welding target 25 to a surface of the welding target 25. FIG. 11 illustrates an exemplary pattern that the laser follows during a laser welding operation. This pattern is not seen to be limiting and any pattern that would enable implementation of the exemplary embodiment(s) is applicable.

Definitions

In referring to the description, specific details are set forth in order to provide a thorough understanding of the examples disclosed. In other instances, well-known methods, procedures, components and circuits have not been described in detail as not to unnecessarily lengthen the present disclosure.

It should be understood that if an element or part is referred herein as being "on", "against", "connected to", or "coupled to" another element or part, then it can be directly on, against, connected or coupled to the other element or part, or intervening elements or parts may be present. In contrast, if an element is referred to as being "directly on", "directly connected to", or "directly coupled to" another element or part, then there are no intervening elements or parts present. When used, term "and/or", includes any and all combinations of one or more of the associated listed items, if so provided.

Spatially relative terms, such as "under" "beneath", "below", "lower", "above", "upper", "proximal", "distal",

TABLE 2

Test Data - Used to determine factor ranges and settings for Weld Structure and Weld Process

| Factors | Test Ranges | | | | Best Factor Settings | |
|---|---|---|---|---|---|---|
| | | | | | Results 1 | Results 2 |
| Weld Seam Clearance | −0.001" | 0.001" | 0.003" | 0.004" | 0.001" | 0.001" |
| Clearance Part to Part | 0.001" | 0.004" | 0.006" | 0.010" | 0.002" | 0.004" |
| Bonding Agent | None | 30.0% | 60.0% | 100.0% | 60% | 100.0% |
| Overlap Thickness | 0.015" | 0.020" | 0.040" | 0.060" | 0.020" | 0.040" |
| Angle of Weld Seam | 15$^\ominus$ | 20$^\ominus$ | 45$^\ominus$ | 60$^\ominus$ | 45$^\ominus$ | 60$^\ominus$ |
| Resin Color | Clear | Red | Blue | Green | Clear | Blue |
| Clamp Force | 0 lbs. | 3 lbs. | 5 lbs. | 10 lbs. | 0 | 5 lbs. |
| Clock Speed | 25000 | 27000 | 31000 | 35000 | 27000 | 33000 |
| Laser Power | 19.00% | 20.00% | 21.00% | 24.00% | 21% | 21% |
| Focal Length | 170 mm | 180 mm | 190, mm | 200, mm | 180 mm | 180 mm |
| Laser Passes | 2 | 6 | 8 | 10 | 6 | 8 |
| Seam Bump Width | 0.040" | 0.060" | 0.080" | 0.100" | 0.060" | 0.060" |
| Seam Bump Height | 0.004" | 0.005" | 0.006" | 0.007" | 0.004" | 0.005" | and the like, may be used herein for ease of description to describe one element or feature's relationship to another element(s) or feature(s) as illustrated in the various figures. It should be understood, however, that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, a relative spatial term such as "below" can encompass both an orientation of above and below. The device may be otherwise oriented (rotated 90 degrees or at other orientations) and the spatially relative descriptors used herein are to be interpreted accordingly. Similarly, the relative spatial terms "proximal" and "distal" may also be interchangeable, where applicable.

The term "about," as used herein means, for example, within 10%, within 5%, or less. In some embodiments, the term "about" may mean within measurement error.

The terms first, second, third, etc. may be used herein to describe various elements, components, regions, parts and/or sections. It should be understood that these elements, components, regions, parts and/or sections should not be limited by these terms. These terms have been used only to distinguish one element, component, region, part, or section from another region, part, or section. Thus, a first element, component, region, part, or section discussed below could be termed a second element, component, region, part, or section without departing from the teachings herein.

The terminology used herein is for the purpose of describing particular embodiments only and is not intended to be limiting. The use of the terms "a" and "an" and "the" and similar referents in the context of describing the disclosure (especially in the context of the following claims) are to be construed to cover both the singular and the plural, unless otherwise indicated herein or clearly contradicted by context. The terms "comprising," "having," "includes", "including," and "containing" are to be construed as open-ended terms (i.e., meaning "including, but not limited to,") unless otherwise noted. Specifically, these terms, when used in the present specification, specify the presence of stated features, integers, steps, operations, elements, and/or components, but do not preclude the presence or addition of one or more other features, integers, steps, operations, elements, components, and/or groups thereof not explicitly stated. Recitation of ranges of values herein are merely intended to serve as a shorthand method of referring individually to each separate value falling within the range, unless otherwise indicated herein, and each separate value is incorporated into the specification as if it were individually recited herein. For example, if the range 10-15 is disclosed, then 11, 12, 13, and 14 are also disclosed. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

It will be appreciated that the methods and compositions of the instant disclosure can be incorporated in the form of a variety of embodiments, only a few of which are disclosed herein. Variations of those embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. At least two resin parts to be assembled by a laser welding process for creating a resin mold for a lost-wax casting process, the at least two resin parts comprising:
   a first resin part including:
      a top surface;
      a side surface; and
      an edge portion between the top surface and the side surface, wherein the edge portion includes a protruding portion protruding outwardly from the top surface, and
   a second resin part including:
      a top surface;
      a side surface to be mated with the side surface of the first resin part; and
      an edge portion, between the top surface of the second resin part and the side surface of the second resin part, wherein the edge portion of the second resin part includes a protruding portion protruding outwardly from the top surface of the second resin part, wherein the protruding portion of the second resin part is mated with the protruding portion of the first resin part to form a single bump with a seam line on a continuous surface of the single bump, and wherein the single bump protrudes outwardly from the top surface of the first resin part and the top surface of the second resin part,
         wherein a dimension of a weld seam between the first resin part and the second resin part is defined by at least a weld angle with a range of 15 to 75 degrees.

2. The at least two resin parts according to claim 1, wherein
   the protruding portion of the first resin part outwardly protrudes from the top surface of the first resin part and the side surface of the first resin part, and
   the protruding portion of the second resin part outwardly protrudes from the top surface of the resin part and recessed from the side surface of the resin part.

3. The at least two resin parts according to claim 1, wherein a dimension of a weld seam between the first resin part and the second resin part is defined by at least a Weld Seam Clearance with a range of −0.001 inches to 0.004 inches, a Weld Seam Overlap Thickness with a range of 0.015 inches to 0.100 inches, or a Weld Seam, Weld Angle with a range of 15 to 75 degrees.

4. The at least two resin parts according to claim 1, wherein a clearance value between the first resin part and the second resin part is defined by at least a Part to Part Clearance with a range of 0.001 inches to 0.011 inches, or a Part clearance Bonding Agent Area with a range of 0% to 100%.

5. The at least two resin parts according to claim 1, wherein a dimension of the single bump is defined by at least a Seam Bump Height with a range of 0.002 inches to 0.010 inches or a Seam Bump Width with a range is 0.030 inches to 0.100 inches.

6. The at least two resin parts according to claim 1, wherein the first resin part and the second resin part are made of polystyrene plastic.

7. A method of assembling at least two resin parts to create a resin mold for a lost-wax casting process, the method comprising:
  providing a first resin part including a top surface, a side surface, and an edge portion between the top surface and the side surface, wherein the edge portion includes a first protruding portion protruding outwardly from the top surface;
  providing a second resin part including a top surface, a side surface to be mated with the side surface of the first resin part, and an edge portion between the top surface of the second resin part and the side surface of the second resin part, wherein the edge portion of the second resin part includes a protruding portion protruding outwardly from the top surface of the second resin part, wherein the protruding portion of the second resin part is to be mated with the protruding portion of the first resin part;
  positioning the first resin part and the second resin part so that the side surface of the first resin part and side surface of the second resin part face each other; and
  performing a laser welding process to irradiate a laser onto at least the protruding portion of the first resin part or the protruding portion of the second resin part to form a single bump with a seam line with a continuous surface of the single bump that outwardly protrudes from the top surface of the first resin part and the top surface of the second resin part;
  wherein a dimension of a weld seam between the first resin part and the second resin part is defined by at least a weld angle with a range of 15 to 75 degrees.

8. The method according to claim 7, wherein a seam face between the protruding portion of the first resin part and the protruding portion of the second resin part is angled to a side of the second resin part with respect to a seam face between the side surface of the first resin part and the side surface of the second resin part, and wherein a laser is directed towards a surface of the protruding portion of the second resin part.

9. The method according to claim 7, wherein a focal length of the laser is in a range of 170 to 200 mm, wherein the focal length is measured from a face of a galvanometer of a laser device to a surface of at least the protruding portion of the first resin part or the protruding portion of the second resin part.

10. The method according to claim 7, wherein a weld seam between the first resin part and the second resin part is welded to create the seam line.

11. The method according to claim 10, wherein the laser repeats a welding pattern while passing over the weld seam that partially overlaps and is arranged along the weld seam.

12. The method according to claim 7, wherein a weld time depends on a clock speed of the laser and a number of times the laser passes over the first resin part and the second resin part, wherein the weld time is a time from starting welding start to stopping welding minus any time required for work piece loading.

13. The method according to claim 10, wherein the laser has a wavelength of from 1900 to 2100 nanometers.

* * * * *